United States Patent [19]

Ivanchenko et al.

[11] Patent Number: 4,497,309
[45] Date of Patent: Feb. 5, 1985

[54] INTERNAL COMBUSTION ENGINE

[75] Inventors: Nikolai N. Ivanchenko; Sergei S. Sokolov, both of Leningrad; Anatoly A. Lazarev; Evgeny M. Kataev, both of Chelyabinsk; Arkady A. Glazunov; Evgeny S. Gorbunov, both of Leningrad, all of U.S.S.R.

[73] Assignee: Tsentralny Iauchno-Issledovatelsky Dizelny Institut, Leningrad, U.S.S.R.

[21] Appl. No.: 380,931

[22] PCT Filed: Sep. 29, 1980

[86] PCT No.: PCT/SU80/00169
  § 371 Date: May 12, 1982
  § 102(e) Date: May 12, 1982

[87] PCT Pub. No.: WO82/01218
  PCT Pub. Date: Apr. 15, 1982

[51] Int. Cl.³ .......................................... F02B 23/06
[52] U.S. Cl. .................................... 123/276; 123/279
[58] Field of Search ................ 123/276, 274, 262, 279

[56] References Cited

U.S. PATENT DOCUMENTS

| | | | |
|---|---|---|---|
| 1,555,204 | 9/1925 | Hesselman | 123/276 |
| 3,020,898 | 2/1962 | Hartmann | 123/276 |
| 3,020,900 | 2/1962 | Hoffman | 123/262 |
| 3,402,704 | 9/1968 | Witzky et al. | 123/276 |
| 3,954,089 | 5/1976 | Hardesty et al. | 123/262 |
| 4,338,898 | 7/1982 | Bauder et al. | 123/279 |

FOREIGN PATENT DOCUMENTS

| | | |
|---|---|---|
| 1955084 | 2/1972 | Fed. Rep. of Germany |
| 2652662 | 3/1978 | Fed. Rep. of Germany |
| 2204224 | 5/1974 | France |
| 2365697 | 4/1978 | France |
| 420723 | 3/1967 | Switzerland |
| 1540457 | 2/1979 | United Kingdom |

OTHER PUBLICATIONS

Ivanchenko et al. "Operation of Diesel Engines with the Chamber in the Piston", Mashinostroenie, pp. 23-25, 29-35.

Primary Examiner—Ira S. Lazarus
Assistant Examiner—R. S. Bailey
Attorney, Agent, or Firm—Burgess, Ryan & Wayne

[57] ABSTRACT

An internal combustion engine comprises a cylinder (1), a cylinder head (2) a piston (3) with a combustion chamber (4) having a conical side wall (6) tapered at an angle of 30° to 60° toward a throat (7), and injection nozzles (5) for delivering fuel to the side wall (6) of the combustion chamber (7) the injection nozzle (5) being disposed eccentrically with respect to the center of the throat (7). An angle $\gamma$ between projections onto the cross section of the combustion chamber of a pair of adjacently spaced outlets (10 and 11) for delivering fuel to the closest to the injection nozzle (5) portion of the side wall (6) of the combustion chamber (4) is 1.8-2.2 times as large as an angle $\delta$ between the projections onto the same plane of axes of any pair of adjacently spaced outlets for delivering fuel to the farthermost from the injection nozzle (5) portion of the side wall (6) of the combustion chamber (4).

6 Claims, 10 Drawing Figures

INTERNAL COMBUSTION ENGINE

FIELD OF THE INVENTION

The present invention relates to engine-building, and more particularly, to internal combustion engines.

The present invention can be most advantageously used in supercharged diesel engines with the cylinder bore up to 145 mm.

BACKGROUND OF THE INVENTION

Internal combustion engines can operate with a low fuel consumption and no-smoke exhaust only in case of an effective mixing, i.e. an effective formation of the combustible fuel-air mixture. In order to intensify the process of evaporation and mixture formation of the fuel injected into the cylinder use is made of the vortex movement of the air charge with respect to the combustion chamber walls.

Most widely used for mixture formation is a vortex movement of the air charge, directed tangentially with respect to the lateral sides of the combustion chamber and produced by a device provided in the inlet member, during the suction process. The tangential vortex movement of the air charge makes it possible to organize a stable mixture formation as well as a uniform concentration of fuel vapours throughout the combustion chamber volume in case of a non-uniform distribution of fuel sprays by the injection nozzle in combustion chamber volume. This contributes to the wide application of the tangential movement of the air-charge in small-size engines with two-valve cylinder heads and, consequently, with injection nozzles displaced from the cylinder axis.

A typical engine wherein a tangential movement of the air charge is used for mixture formation, is a diesel engine according to the British Pat. No. 1,167,015 published Oct. 15, 1969. The engine comprises a combustion chamber provided in a piston, the centre of the combustion chamber coinciding with or being disposed near the axis of the cylinder. The combustion chamber is so arranged that when the piston is in the top dead centre position at the end of the compression stroke, almost all of the combustion air is disposed in the chamber. Means are provided for producing, during the suction stroke, the rotational movement of the combustion air in a vortex around the axis of the combustion chamber. The injection nozzle is displaced from the axis of the chamber and has at least two discharge openings, or fuel spray outlets, spaced above the maximum diameter of the combustion chamber, with the piston in the top dead centre position. The injection nozzle discharges fuel sprays of different lengths, the sprays being directed toward the cylinder axis, and extending substantially transversely to the vortex in the combustion chamber and not spraying over the edge of the combustion chamber opening. A part of the injected fuel strikes against the combustion chamber wall surface and a part of the injected fuel is distributed in the combustion air of the combustion chamber. One of the fuel sprays, the longest one, is directed towards the combustion chamber side wall and initiates the ignition of the fuel, while the other or others have an opposite direction so that they impinge on the combustion chamber side wall where the fuel injection nozzle is arranged at approximately the same height, at which the longest fuel spray hits the middle part of the combustion chamber side wall. In case the injection nozzle has at least three fuel spray outlets, the projections thereof upon the plane perpendicular to the cylinder axis are disposed asymmetrically with respect to the diametral plane extending through the axis of the combustion chamber and the injection nozzle axis. If the injection nozzle has only two fuel spray outlets, the axes of the same are situated in the diametral plane extending through the combustion chamber axis and the injection nozzle axis. In said engine the intersection point of the axes of the injection nozzle fuel spray outlets is spaced from the combustion chamber axis at a distance equal to at least one fifth of the maximum diameter of the combustion chamber. Positioning of the injection nozzle eccentrically with respect to the combustion chamber axis in said engine makes it possible to arrange inlet and outlet valves as well as inlet and outlet ports of sufficient cross sections. Owing to the central arrangement of the combustion chamber a uniform temperature is provided in the vicinity of the annular grooves in the pistons. In said engine the direction of the fuel sprays is such that no spray adversely affects another spray which may be caused by the vortex motion of the air charge, whereby optimum conditions are provided for producing the fuel mixture.

However, in said engine like in all other engines with the tangential rotation of the air charge, the rotational movement of the air charge in the combustion chamber attenuates with the piston moving downward from the top dead centre position at the beginning of the expansion stroke, when, in the supercharge-rated engine, the processes of the fuel injection and combustion are not completed yet. In this case both the intensity of mixture formation and the homogeneity of distribution of the fuel vapours throughout the combustion chamber volume are impaired. The rotational movement ceases at the instant when the rotation should still continue so as to increase the combustion efficiency. Attempts to raise the rotational speed of the air charge in order to prolong the action of the tangential currents result in a higher pressure drop in the inlet members, thus reducing the filling of the cylinder with a fresh air charge. Besides, high speeds of the vortex at the beginning of the injection may adversely affect the conditions of the fuel self-ignition and result in a more rough operation of the engine.

It has been proposed to apply, for the purposes of mixture formation, the vortex movement of the air charge in the radial direction with respect to a specially inclined side wall of the combustion chamber. The vortex movement arises when the air charge is forced from the cylinder volume into the chamber in the piston, the latter moving towards the upper position at the end of the compression process, and the air charge and combustion products pass in the reverse direction as the piston moves downwards at the beginning of the expansion process. The vortex movement in the radial direction is most effective in case of the uniform distribution of the fuel sprays throughout the combustion chamber volume, as the tangential components of the air charge velocity appearing with a non-uniform distribution of the fuel sprays throughout the combustion chamber volume are unable of displacing the fuel in the combustion chamber volume in the tangential direction and equalize the concentration of its vapours. Therefore, the formation of the mixture by means of the radial movement of the air charge is used mainly in engines having their injection nozzle disposed centrally with respect to the combustion chamber, the fuel sprays being dispersed uniformly with respect to the injection nozzle and the chamber, the radial currents occurring throughout the combustion chamber.

In engines with two-valve cylinder heads no space is provided for arranging the injection nozzles, therefore, the injection nozzles are spaced from the cylinder axis and disposed eccentrically with respect to the combustion chamber in the piston. In this case the impaired mixture formation resulting from the displacement of the injection nozzle is compensated for by a sufficient passage section of the valves and outlets, as well as by simple design of the cylinder head.

A typical engine with a two-valve cylinder head and an injection nozzle displaced with respect to the cylinder axis, wherein use is made of the radial vortex movement of the air charge, is the internal combustion engine described in the book "Operation of Diesel Engines with the Chamber in the Piston" (N. N. Ivanchenko and others, 1972, Mashinostroenie Leningrad, pp. 23–25; 29–36). The engine comprises a chamber in a piston, the chamber having a conical side wall tapering toward the throat, and an injection nozzle with a plurality of fuel spray outlets symmetrically and uniformly spaced with respect to the injection nozzle axis for injecting the fuel onto the side wall of the combustion chamber disposed in the cylinder head with the eccentricity from 0.1 to 0.25 of the combustion chamber throat radius. The optimum relationship of the volume of the combustion chamber in the piston to the total volume of the combustion chamber is at least 0.78–0.80, the optimum diameter of the throat being 0.35–0.37 of the cylinder bore. The volume-film mixture formation in the engine is accomplished by acting on the fuel sprays and fuel films applied onto the combustion chamber walls of radial air streams and small-scale turbulent vortex, these being produced in the course of forcing the air charge out of the cylinder volume into that of the chamber in the piston, when the piston moves in the upward direction at the end of the compression process, at the instant of the injection nozzle injecting the fuel into the cylinder, and the air charge and combustion products passing in reverse direction, out of the volume of the combustion chamber in the piston into the cylinder volume when the piston moves downward at the beginning of the expansion process. In said engine the movement of the air charge occurs during the entire fuel injection process, thus raising the efficiency of the mixture formation and fuel combustion in the supercharged engines.

However, in said engine, as well as in other engines of this kind, there takes place a non-uniform distribution of the fuel throughout the combustion chamber volume and relative to radial streams, thus causing a non-uniform concentration of the fuel and its vapours in the combustion chamber. In the engine the mixture formation and the combustion of a part of the fuel injected by the nozzle in the direction of the combustion chamber side wall closest thereto occur in a disproportionally smaller part of the air charge as compared to the mixture formation and combustion of the portion of the fuel injected in the direction of the combustion chamber wall situated farther from the injection nozzle, thus considerably impairing the efficiency of the mixture formation and combustion of the whole fuel injected into the cylinder. In case of the higher supercharge ratings, i.e. the increased cyclic fuel deliveries, the radial streams alone are not sufficient for the effective mixing of the fuel sprays non-uniformly dispersed throughout the combustion chamber, whereas the application of conventional methods of "vortexing" the stream in the tangential direction results in additional pressure losses during the admittance of the air into the cylinder. Besides, the longer flames in case of the increased cyclic fuel injections, accomplished at the equal angles with respect to the injection nozzles, are distributed in the combustion chamber space in such a manner that the combustion products when passing from the chamber in the piston into the cylinder volume intersect the fuel flames and prevent the fresh air from getting to the fuel, thus impairing the mixture formation and combustion. The decreased amount of air introduced into the combustion space increases the temperature as well as thermal stresses in the chamber walls thus causing cracks in the chamber throat edges.

SUMMARY OF THE INVENTION

The principal object of the present invention is to provide an internal combustion engine, wherein spray outlets of the injection nozzle for delivery fuel onto the combustion chamber side walls should be arranged so as to ensure mixture formation and fuel combustion accomplished with uniform distribution thereof throughout the combustion chamber volume and uniformly during the entire combustion process.

With this principal object in view, there is proposed an internal combustion engine comprising a cylinder, a cylinder head, a piston provided with a combustion chamber having a conical side wall tapered towards a throat, and an injection nozzle with fuel spray outlets for delivering fuel onto the combustion chamber side walls, disposed in the cylinder head with an eccentricity with respect to the centre of the throat wherein, according to the invention, an angle $\gamma$ between the projections of the axes of the two adjacently spaced fuel spray outlets for delivering fuel onto the nearest to the injection nozzle portion of the combustion chamber wall onto the combustion chamber cross section plane is 1.8–2.2 times greater than an angle $\delta$ between the projections onto the same plane of the axes of any pair of adjacent fuel spray outlets for delivering fuel onto that portion of the combustion chamber wall which is farthermost from the injection nozzle.

The present invention makes it possible to attain not only the uniform distribution of the fuel throughout the combustion chamber volume, but also uniform delivery of the air to fuel sprays during the entire process of the mixture formation and combustion. This results from that at the end of compression the fuel sprays are injected into the combustion chamber under equal angles to the radial movements of the air charge arising during passing of the air charge out of the cylinder volume into the volume of the combustion chamber of the piston. The radial streams acting upon the fuel sprays at an angle displace the fuel vapours toward the centre, thus increasing the concentration of the fuel vapours in the combustion chamber volume at that portion of the combustion chamber wall which is farthermost from the injection nozzle, the increased concentration contributing to the self-ignition of the fuel. In so doing the tops of the fuel flames embracing the radial portion of the chamber wall are deflected into the gaps between the fuel sprays and leave the combustion chamber without either intersecting with the fuel sprays or interfering with the delivery of the fresh air into the combustion space. As the piston moves downward at the beginning of the expansion process, the radial streams arising during the passage of the air charge and combustion products out of the combustion chamber in the piston into the cylinder volume and acting at an angle upon the fuel sprays from the centre of the combustion chamber, displace the fuel vapours in the reverse direction to the space of the unused portion of the air charge. This results in a more complete utilization of the air charge for combustion.

The above and other objects, features and advantages of the present invention will be apparent from the following detailed description of illustrative embodiments thereof, which is to be read in conjunction with the accompanying drawings.

BEST MODE TO CARRY OUT THE INVENTION

Figure 1:
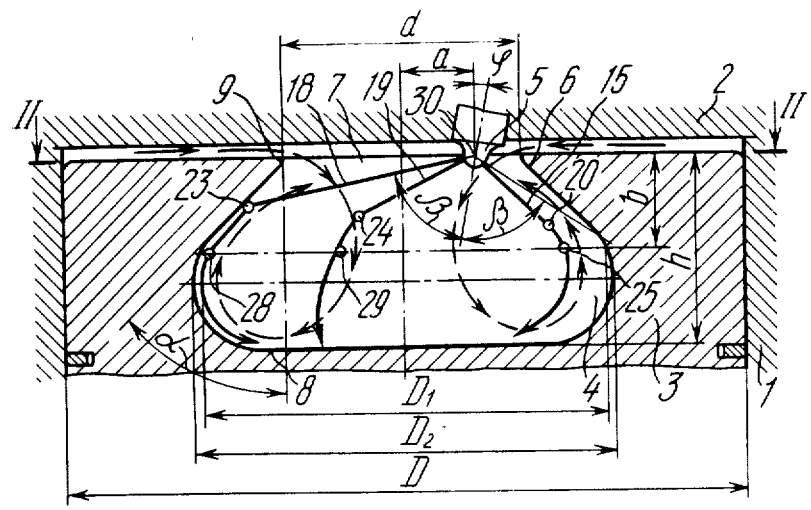
FIG. 1 is a plan view of an internal combustion engine according to the invention taken in section through the combustion chamber in the piston with the latter approaching the top dead centre position at the end of the compression process.

The internal combustion engine comprises a cylinder 1 (FIG. 1), a head 2 of the cylinder 1, a piston 3 with a combustion chamber 4, and an injection nozzle 5. The combustion chamber 4 in the piston 3 has a conical side wall 6 tapered towards a throat 7 of the combustion chamber 4. The side wall 6 is inclined at an angle $\alpha$ of from 30° to 60° to attain a vortex movement of an air charge in the radial direction. The reason for said angle range is that an inclination of the wall 6 less than 30° does not provide an intensive vortex formation, while an inclination exceeding 60° causes a higher resistance to the movement of the air charge. The tansition from the side tapered wall 6 to a bottom 8 of the combustion chamber 4 is smooth, with a large radius. The optimum dimensions for said combustion chamber 4 in the piston 3 are as follows: inclination of the side wall 6 is 40°–60°; d, the diameter of the throat 7 is 0.35–0.37 of diameter D of the cylinder 1, the volume of the combustion chamber 4 in the piston 3 is 0.78–0.8 of the total combustion chamber volume, with the piston 3 in the top dead centre position. Diameter $D_1$ of the combustion chamber 4 at a distance b from an edge 9 of the throat 7 equal to one half height h of the combustion chamber 4 is less than the maximum diameter $D_2$ located lower.

The injection nozzle 5 is arranged in the head 2 of the cylinder 1 with an eccentricity a with respect to the centre of the throat 7 of the combustion chamber 4. The maximum value of the eccentricity a is determined by the possibility for the fuel sprays to be discharged into the combustion chamber 4 via the throat 7 of a diameter d. The injection nozzle 5 has fuel spray outlets 10, 11, 12, 13 and 14 (FIG. 2) for delivering the fuel to the combustion chamber 4. Axes 15, 16, 17, 18 and 19 of the outlets 10, 11, 12, 13 and 14, respectively, in the extension thereof, impinge on the side wall 6 of the combustion chamber 4 at positions 20, 21, 22, 23 and 24, and pass over positions 25, 26, 27, 28 and 29 spaced uniformly along the circumference of the above mentioned diameter $D_1$.

The fuel spray outlets 10 and 11 serve for directing the fuel onto the closest to the injection nozzle 5 section of the side wall 6 of the combustion chamber 4 at the positions 20 and 21. The outlets 12, 13, and 14 serve to direct the fuel onto the farthermost from the injection nozzle 5 section of the side wall 6 at the positions 22, 23 and 24. The angle $\gamma$ between the projections onto the combustion chamber 4 cross section plane, of the axes 15 and 16 of the pair of outlets 10 and 11 is 1.8–2.2 times as large as the angle $\delta$ between the projections onto the same plane of the axes 17 and 18 or 18 and 19 of the pairs of the outlets 12 and 13 or 13 and 14, respectively.

The axes 15, 16, 17, 18 and 19 of the outlets 10, 11, 12, 13 and 14 are deflected by an angle $\beta$ from the longitudinal axis of the injection nozzle 5 (FIG. 1) and intersect at a position 30 lying on the level of the edge 9 of the throat 7, with the piston 3 being in the top dead centre position. The axes of these outlets of the injection nozzle 5 are the generants of the conical surface having an angle $2\beta$ at its vortex at the position 30. The injection nozzle 5 is deflected from its vertical position by an angle $\phi$ in such a manner that, with the piston 3 in the top dead centre position, the conical surface intersects with the wall 6 of the combustion chamber 4 at the depth of $\frac{3}{4}$b from the edge 9 in the part thereof closest to the injection nozzle 5, and at the depth $\frac{1}{4}$b in the part of the edge 9 farthermost from the nozzle 5.

In case of five outlets in the injection nozzle 5 the object of the invention is achieved completely with the angle $\gamma$ between the projections of the axes 15 and 16 of the outlets 10 and 11 in the range from 104° to 114° and the angle $\delta$ between the projections of the axes 17 and 18 or 18 and 19 of the outlets 12 and 13 or 13 and 14, respectively, within the range from 52° to 58°, said relationship of these angles being observed.

Figure 2:
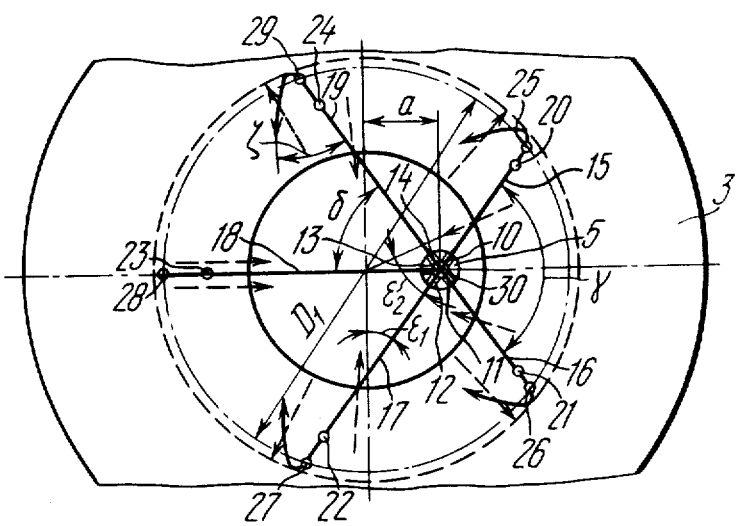
FIG. 2 is a sectional view taken along line II—II of FIG. 1.

FIGS. 1 and 2 show the engine with the piston 3 near the top dead centre position at the end of the compression and beginning of the combustion of the fuel.

Figure 3:
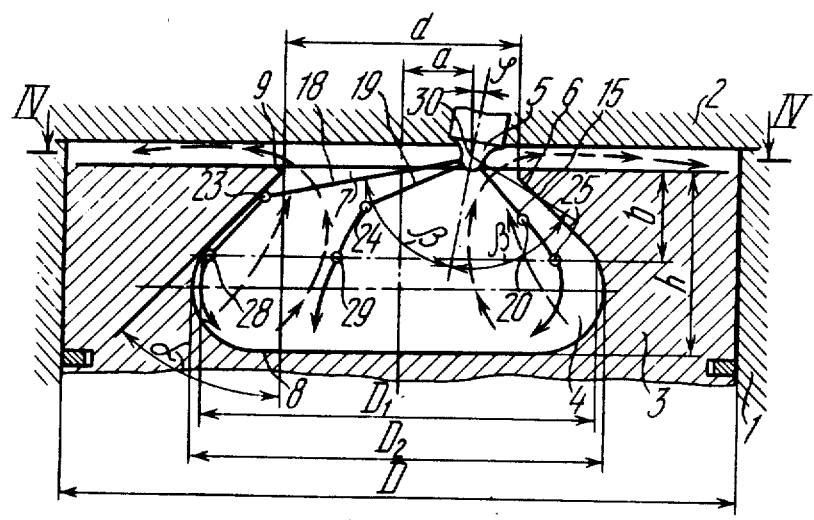
FIG. 3 is the same as in FIG. 1 with the piston moving downwards at the beginning of expansion.
Figure 4:
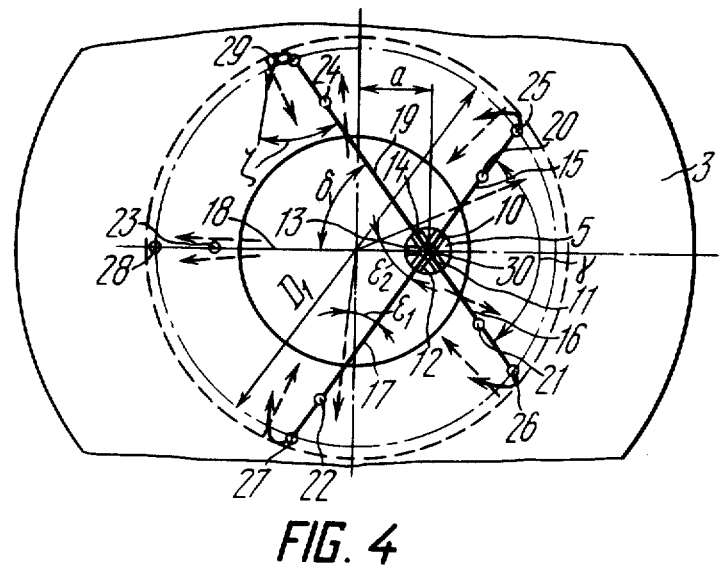
FIG. 4 is a sectional view taken along line IV—IV of FIG. 3.
Figure 5:
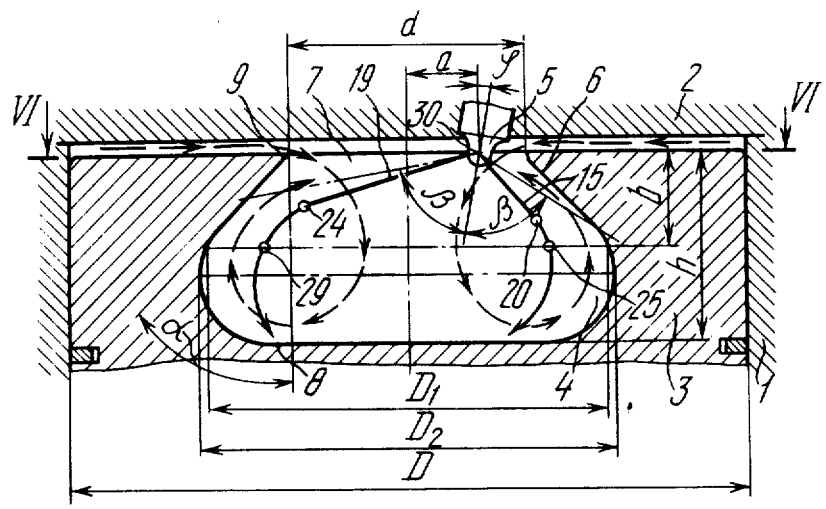
FIG. 5 is the same as in FIG. 1, with an injection nozzle having four fuel spray outlets for feeding fuel.
Figure 6:
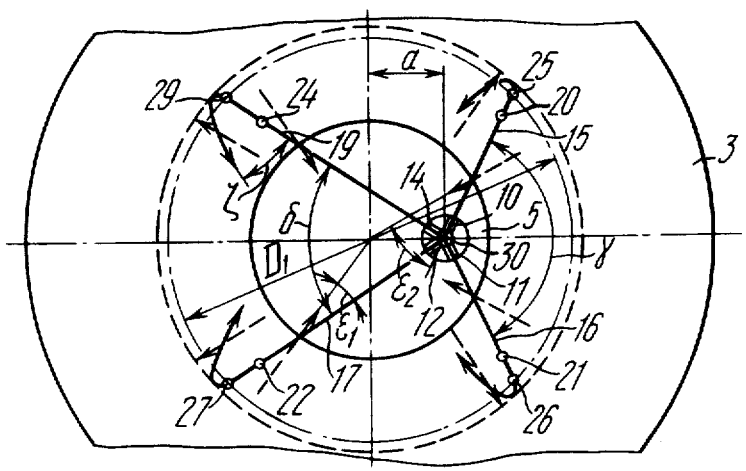
FIG. 6 is a sectional view taken along line VI—VI of FIG. 5.
Figure 7:
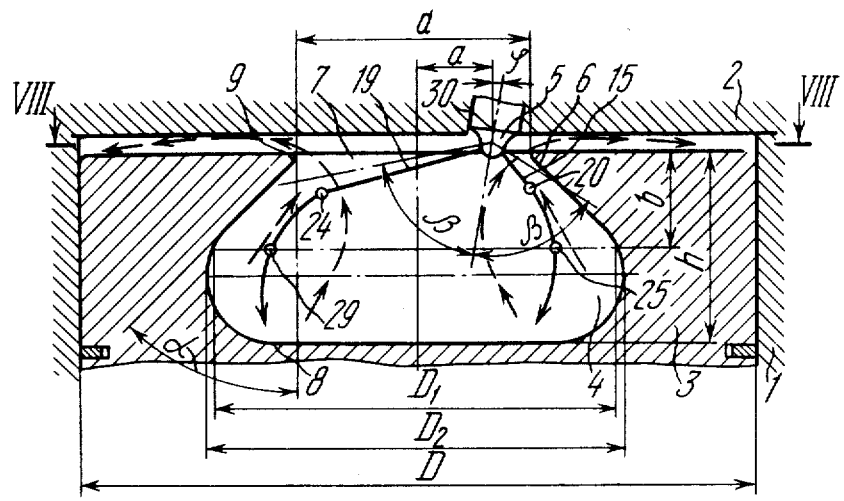
FIG. 7 is the same as in FIG. 5, with the piston moving downward at the beginning of expansion.
Figure 8:
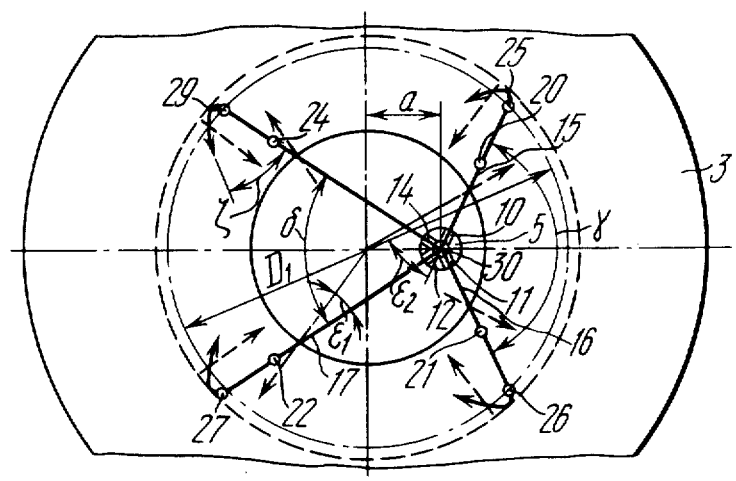
FIG. 8 is a sectional view taken along line VIII—VIII of FIG. 7.

FIGS. 3 and 4 show the same as FIGS. 1 and 2, but with the piston 3 moving downward from the top dead centre at the beginning of the expansion and at the end of the fuel injection.

FIGS. 5, 6, 7 and 8 show the engine according to the invention with the injection nozzle 5 having four fuel spray outlets. The arrangement of the engine in this case is similar to that described above. The difference is in that the injection nozzle 5 (FIG. 6) has the outlets 10, 11, 12 and 14 only, the axes 15, 16, 17 and 19 thereof, respectively, in their extension intersecting the side wall 6 of the combustion chamber 4 at the positions 20, 21, 22 and 24, and passing above the positions 25, 26, 27 and 29 spaced uniformly along the circumference of the diameter $D_1$.

The angle $\gamma$ between the projections onto the cross section plane of the combustion chamber 4, of the axes 15 and 16 of the pair of the fuel spray outlets 10 and 11 is 1.8–2.2 times as large as the angle $\delta$ between the projections onto the same plane of the axes 17 and 18 of the pair of the fuel spray outlets 12 and 14.

If the injection nozzle 5 has four fuel spray outlets only, the object of the invention is completely achieved with the angle γ between the projections of the axes 15 and 16 of the outlets 10 and 11 within the range from 130° to 140° and the angle δ between the projections of the axes 17 and 19 of the outlets 12 and 14 within the range from 64° to 72°, the above relationship between the angles being observed.

Figure 9:
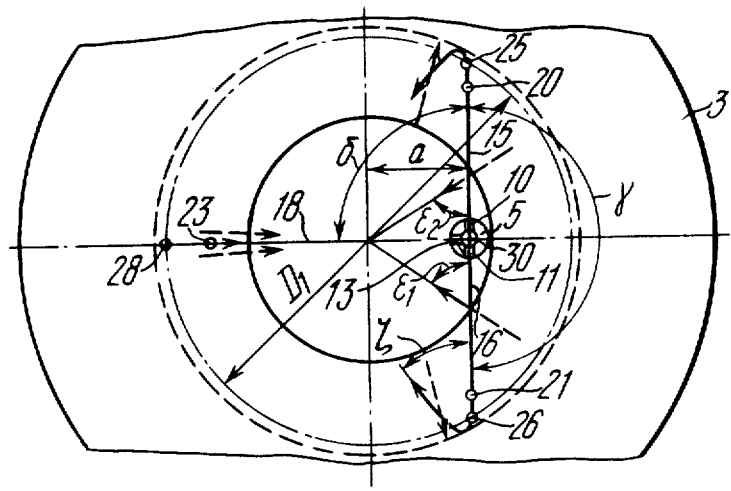
FIG. 9 is the same as in FIG. 2 with the injection nozzle having three fuel spray outlets for delivering fuel.

The engine according to the invention with the injection nozzle 5 having three fuel spray outlets is shown in FIG. 9. In this case the arrangement of the engine is similar to that described above. The difference is that the injection nozzle 5 has the outlets 10, 11, and 13 only, the axes 15, 16 and 18 thereof, respectively, in their extension intersecting with the side wall 6 of the combustion chamber 4 at the positions 20, 21 and 23, and passing above the positions 25, 26 and 28 spaced uniformly along the circumference $D_1$.

The angle γ between the projections onto the combustion chamber cross section, of the axes 15 and 16 of the pair of the fuel spray outlets 10 and 11 is 1.8-2.2 times as large as the angle δ between the projections onto the same plane of the axes 16 and 18 or 18 and 15 of the pair of the outlets 11 and 13, or 13 and 10, respectively.

If the injection nozzle 5 has three fuel spray outlets only, the object of the invention is completely achieved with the angle γ between the projections of the axes 15 and 16 of the fuel spray outlets 10 and 11 within the range from 170° to 188° and the angle δ between the projections of the axes 16 and 18 or 18 and 15 of the pairs of the fuel spray outlets 11 and 13 or 13 and 10, respectively, within the range from 86° to 95°, the said relationship between the angles being observed.

Figure 10:
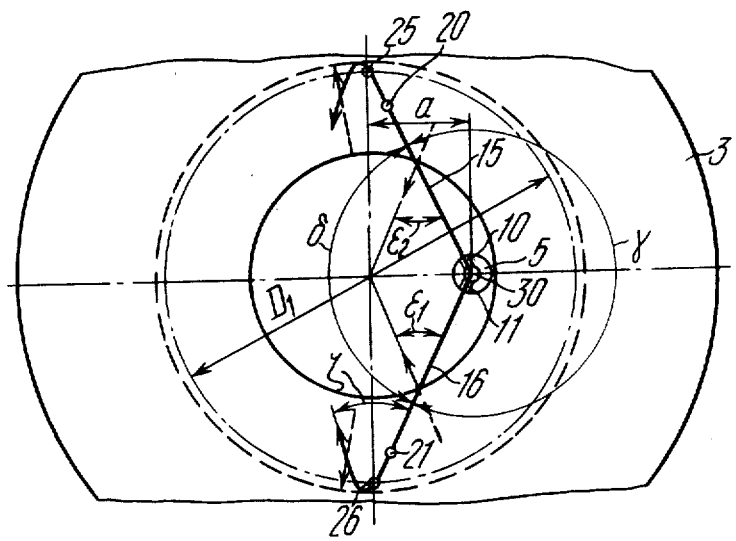
FIG. 10 is the same as in FIG. 9; with the injection nozzle having two fuel spray outlets for delivering fuel.

FIG. 10 shows the engine according to the invention with the injection nozzle 5 having two fuel spray outlets. In this case the arrangement of the engine is similar to that described above. The difference is in that the injection nozzle 5 has the outlets 10 and 11 only, the axes 15 and 16 thereof, respectively, in their extension intersect with the side wall 6 of the combustion chamber 4 at the positions 20 and 21 and pass above the positions 25 and 26 spaced uniformly along the circumference $D_1$.

In this case the fuel spray outlets serve to deliver fuel onto both the closest to and farthermost from the injection nozzle 5 section of the side wall 6 of the combustion chamber 4.

The angle ε between the projections on the combustion chamber 4 cross section of the axes 15 and 16 of the pair of the fuel spray outlets 10 and 11, measured from the section of the side wall 6 closest to the injection nozzle 5, is 1.8-2.2 times as large as the angle δ between the projections onto the same plane of the same pair of the outlets, the angle being measured from the farthermost section of the side wall 6.

In case the injection nozzle 5 has two fuel spray outlets only, the object of the invention is completely achieved with the angle γ within the range from 232° to 248°, or the angle δ within the range from 112° to 128°.

The engine according to the invention operates as follows.

As the piston 3 (FIGS. 1 and 2) moves toward the upper position at the end of the compression process, the air charge passes out of the cylinder 1 volume into the combustion chamber 4 and attains a vortex movement in the radial direction with respect to the side wall 6. The radial streams of the air charge are indicated in broken arrows. By means of the injection nozzle 5, via the fuel spray outlets 10, 11, 12, 13 and 14, the fuel sprays are directed toward the axes 15, 16, 17, 18 and 19, respectively, which after impinging on the side wall 6 at the positions 20, 21, 22, 23 and 24, and forming a film thereon, move downstream to the bottom 8 of the combustion chamber 4. The direction of the axes of the fuel sprays and flame ends after the ignition thereof is indicated in solid arrows.

The radial streams of the air charge intersect the axes 15, 16, 17 and 19 of the fuel sprays issued by the outlets 10, 11, 12 and 14 at angles $\epsilon_1$ and $\epsilon_2$, thus displacing the fuel vapours towards the combustion chamber 4 centre. This accelerates the formation of the fuel vapours and raises the concentration thereof in the combustion chamber 4 volume from the section of the side wall 6 farthermost from the injection nozzle 5, thus speeding up the self-ingnition of the fuel as well as the combustion thereof.

The ends of the flames formed after the ignition of said fuel sprays in their downstream movement toward the bottom 8, pass in spiral round the radial portion of the side wall 6 and deflect by an angle ξ from the bases of these fuel sprays into the gaps therebetween. As a result, the combustion products are exhausted from the chamber 4 through the throat 7 thereof without either intersecting fuel sprays or interfering with the fresh air supply to the combustion space.

As the piston 3 (FIGS. 3 and 4) moves downward at the beginning of the expansion and at the end of the fuel injection by means of the injection nozzle 5, the radial streams formed during the passage of the air charge and combustion products out of the combustion chamber 4 into the cylinder 1 volume, intersect the axes 15, 16, 17 and 19 of the fuel sprays issued by the outlets 10, 11, 12 and 14 at the angles $\epsilon_1$ and $\epsilon_2$, working upon the fuel sprays in the reverse direction from the combustion chamber 4 centre. In doing so the radial streams displace the fuel vapours towards the unutilized portion of the air charge on the opposite, from the combustion chamber 4 centre, side of the fuel sprays delivered by the outlets 12 and 14, and therefrom, toward the unused portion the air charge in the sector between the fuel sprays delivered by the outlets 10 and 11.

As a result, the combustion of the fuel at the end of its delivery process is intensified, the air charge being more thorougly utilized for the combustion of the fuel.

The fuel spray issued by the outlet 13 of the injection nozzle 5 in the direction of the axis 18 participates in the process of mixture formation and combustion in the same way as in the conventional engine having a combustion chamber in the piston thereof.

Thus organized, the processes of the mixture formation and fuel combustion eliminate the lack of the air in the combustion space, thereby excluding the excess rise of temperature as well as local thermal stresses in the walls of the combustion chamber 4, which, in its turn, eliminates the appearance of cracks on the edges 9 of the throat 7 of the combustion chamber 4.

The operation of the engine with the injection nozzle 5 (FIGS. 5, 6, 7 and 8) having four fuel spray outlets proceeds in the manner described above, the difference being in that only the fuel sprays issued by the outlets 10, 11, 12 and 14 participate in the processes of mixture formation and combustion.

The engine with the injection nozzle (FIG. 9) having three fuel spray outlets operates in the manner similar to the above described, the difference being in that only the fuel sprays issued by the outlets 10, 11 and 13 participate in the processes of mixture formation and combustion.

The engine with the injection nozzle 5 (FIG. 10) having two fuel spray outlets operates in the manner similar to the above described, the difference being in that only the fuel sprays issued by the outlets 10 and 11 participate in the processes of mixture formation and combustion.

The above described processes of the fuel evaporation, raising the concentration of the fuel vapours during the self-ignition period thereof, removal of the combustion products from the combustion space without interfering with the fuel sprays, and displacement of the fuel vapours towards the unused portion of the air charge can be accomplished only with the said disposition of the injection nozzle fuel spray outlets.

In all cases with the relationship between the angles $\gamma$ and $\delta$ less than 1.8 the processes of the self-ignition and beginning of combustion will proceed with the excess of air, whereas the final period of the fuel combustion will suffer from the lack of the air. Besides, the excess portion of the air will not be utilized at the end of the fuel combustion, thus reducing the efficiency of the engine operation.

In all cases, with the relationship of the angle $\gamma$ to the angle $\delta$ over 2.2, the processes of the self-ignition and beginning of combustion will proceed with the lack of air, whereas there will be an excess of air in the final period of the fuel combustion, the excess of air remaining unused in the final period of the fuel combustion thus reducing the efficiency of the engine operation.

While particular embodiments of the invention have been shown and described, it will be obvious to those skilled in the art the various changes and modifications which may be made thereto without departing from the essential features of the present invention and, therefore, as the scope is now stated in the claims.

INDUSTRIAL APPLICABILITY

The present invention may be applied for all direct injection, compression ignition internal combustion engines having two-valve cylinder heads.

The present invention may be most advantageously used for supercharge-rated engines, the effectiveness of the invention increasing with the increase of the supercharge, i.e. with the increase of the cyclic fuel delivery and the amount of the air charge.

For realization of the invention it is necessary to arrange a combustion chamber in the piston with an inclined side wall and to have an injection nozzle displaced eccentrically with respect to the throat of the combustion chamber, the fuel spray outlets being located according to the invention.

What is claimed is:

1. A diesel engine, comprising:
    at least one cylinder;
    a cylinder head at the top of said cylinder, said cylinder head having air inlet means for letting air into said cylinder;
    an injection nozzle for injecting fuel jets into the top of said cylinder; and
    a piston having a combustion chamber for receiving said fuel jets when said piston is adjacent said cylinder head, said combustion chamber having a frustoconical side surface extending from a relatively narrow open throat at the top of said chamber to a transition region adjacent a relatively wide bottom surface of the chamber, said throat having a peripheral edge,
    said frustoconical side surface tapering in the direction of the throat at an angle of 30°-60° to the cylinder axis,
    the diameter of said throat being equal to 0.32-0.37 times the cylinder inside diameter,
    the transition region from said frustoconical side surface of said bottom surface of the combustion chamber being smooth along a radius thereof,
    the diameter $D_1$ of the combustion chamber at a distance b from said throat edge equal to half the height h of the combustion chamber between the closest plane of said throat edge and said bottom surface being less than the maximum diameter $D_2$ of the transition region,
    said injection nozzle being mounted in an inclined position in the cylinder head relative to the cylinder axis, said injection nozzle being positioned relatively close to the throat edge and relatively remote from the center of said throat, at a position permitting penetration of fuel jets from said nozzle into said combustion chamber through the throat thereof,
    said injection nozzle having at least four fuel jet channels for directing fuel jets onto the side surface of the combustion chamber, so that mixing is effected when the fuel jets are acted upon by radial vortex streams of an air charge appearing in the combustion chamber during the motion of the piston at the end of the compression cycle and at the beginning of the expansion cycle,
    the extended axes of said fuel jet channels intersecting the side surface of the combustion chamber above the portion thereof having the diameter $D_1$,
    said extended channel axes forming different angles with each other and dividing each horizontal section of said side surface into a plurality of parts,
    the angle between the projections of the extended channel axes of a first pair of adjacent channels for supply of fuel onto the closest part of the combustion chamber side surface to said nozzle being 1.8 to 2.2 times the angle between the projections of the extended channel axes of any other pair of adjacent channels for supply of fuel onto the portion of the combustion chamber side surface which is most remote from said nozzle,
    said channel axes being inclined at an angle $\beta$ from the longitudinal axis of said nozzle and intersecting at a point lying substantially in the plane of the upper edge of said throat when the piston is in the top dead center position thereof, said channel axes being generatrices of a conical surface with a vertex angle $2\beta$,
    said injection nozzle being inclined from a vertical axis parallel to the cylinder axis by an angle $\phi$, said frustoconical side surface intersecting the side surface of the combustion chamber (i) on the side of the throat closest to the nozzle at a depth of $\frac{1}{3}$b from the throat edge, and (ii) on the side of the edge of said throat most remote from the nozzle at a depth of $\frac{1}{3}$b, where b is equal to half the height of the combustion chamber between the plane of said upper throat edge and said bottom surface.

2. The diesel engine according to claim 1, wherein the angle between the projections of the extended channel axes of said first pair of adjacent channels is between 104° and 114°, and the angle between the projections of the extended channel axes of any other pair of adjacent channels is between 52° and 58°.

3. The diesel engine according to claim 1, wherein the angle between the projections of the extended channel axes of said first pair of adjacent channels is between 130° and 140°, and the angle between the projections of the extended channel axes of any other pair of adjacent channels is between 64° and 72°.

4. The diesel engine according to claim 1, wherein the angle between the projections of the extended channel axes of said first pair of adjacent channels is between 170° and 188°, and the angle between the projections of the extended channel axes of any other pair of adjacent channels is between 86° and 95°.

5. The diesel engine according to claim 1, wherein the angle between the projections of the extended channel axes of said first pair of adjacent channels is between 232° and 248°, and the angle between the projections of the extended channel axes of any other pair of adjacent channels is between 112° and 128°.

6. A diesel engine, comprising:

at least one cylinder;

a cylinder head at the top of said cylinder, said cylinder head having air inlet means for letting air into said cylinder;

an injection nozzle for injecting fuel jets into the top of said cylinder; and a piston having a combustion chamber for receiving said fuel jets when said piston is adjacent said cylinder head, said combustion chamber having a frustoconical side surface extending from a relatively narrow open throat at the top of said chamber to a transition region adjacent a relatively wide bottom surface of the chamber, said throat having a peripheral edge, said frustoconical side surface tapering in the direction of the throat at an angle of 30°-60° to the cylinder axis, the diameter of said throat being equal to 0.32-0.37 times the cylinder inside diameter, the transition region from said frustoconical side surface to said bottom surface of the combustion chamber being smooth along a radius thereof, the diameter $D_1$ of the combustion chamber at a distance b from said throat edge equal to half the height h of the combustion chamber between the plane of said throat edge and said bottom surface being less than the maximum diameter $D_2$ of the bottom surface, said injection nozzle is mounted in an inclined position in the cylinder head relative to the cylinder axis, said injection nozzle being positioned relatively close to the throat edge and relatively remote from the cylinder axis, at a position permitting penetration of fuel jets from said nozzle into said combustion chamber through the throat thereof, said nozzle having at least four fuel jet channels for directing fuel jets onto the side surface of the combustion chamber, so that mixing is effected when the fuel jets are acted upon by radial vortex streams of an air charge appearing in the combustion chamber during the motion of the piston at the end of the compression cycle and at the beginning of the expansion cycle, the extended axes of the said fuel jet channels intersecting the side surface of the combustion chamber above the portion thereof having the diameter $D_1$, said extended channel axes forming different angles with each other and dividing each horizontal section of said side surface into a plurality of parts, the angle between the projections of the extended channel axes of a first pair of adjacent channels for supply of fuel onto the closest part of the combustion chamber side surface to said nozzle being 1.8 to 2.2 times the angle between the projections of the extended channel axes of any other pair of adjacent channels for supply of fuel onto the portion of the combustion chamber side surface which is most remote from said nozzle.

* * * * *